United States Patent
Carr et al.

(10) Patent No.: US 10,045,656 B2
(45) Date of Patent: Aug. 14, 2018

(54) BEVERAGE PREPARATION SYSTEM, A CODED INSERT AND METHODS OF USE THEREOF

(71) Applicant: Koninklijke Douwe Egberts B.V., Utrecht (NL)

(72) Inventors: Simon Carr, Banbury (GB); Sandra Heraud, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 605 days.

(21) Appl. No.: 14/372,197

(22) PCT Filed: Jan. 29, 2013

(86) PCT No.: PCT/IB2013/000221
§ 371 (c)(1),
(2) Date: Jul. 14, 2014

(87) PCT Pub. No.: WO2013/117990
PCT Pub. Date: Aug. 15, 2013

(65) Prior Publication Data
US 2015/0017293 A1  Jan. 15, 2015

(30) Foreign Application Priority Data
Feb. 7, 2012   (GB) .................................. 1202089.7

(51) Int. Cl.
*A47J 31/40*   (2006.01)
*A47J 31/44*   (2006.01)
(Continued)

(52) U.S. Cl.
CPC ....... *A47J 31/4492* (2013.01); *A47J 31/3623* (2013.01); *A47J 31/407* (2013.01);
(Continued)

(58) Field of Classification Search
CPC .. A47J 31/4492; A47J 31/3623; A47J 31/407; B65D 85/8043; B65D 2203/06
See application file for complete search history.

(56) References Cited

U.S. PATENT DOCUMENTS

| 5,797,519 A | 8/1998 | Schroeder et al. |
| 7,673,558 B2 | 3/2010 | Panesar et al. |

(Continued)

FOREIGN PATENT DOCUMENTS

| CN | 1942125 A | 4/2007 |
| CN | 101090657 A | 12/2007 |

(Continued)

OTHER PUBLICATIONS

Branwyn, http://makezine.com/2007/12/03/hacking-a-tassimo-coffee/ dated Dec. 2007.*
(Continued)

*Primary Examiner* — Erik Kashnikow
*Assistant Examiner* — Lela S. Williams
(74) *Attorney, Agent, or Firm* — Fitch, Even, Tabin & Flannery LLP

(57) ABSTRACT

A beverage preparation system is provided comprising a beverage preparation machine, a cartridge containing one or more beverage ingredients, and a coded insert. The beverage preparation machine comprises a brew head for receiving the cartridge. The cartridge comprises a primary code configured to provide operating instructions to the beverage preparation machine for delivering a beverage from the cartridge. The coded insert is separate from the cartridge and insertable along with the cartridge into the brew head. The coded insert comprises a secondary code configured to provide alternative operating instructions to the beverage preparation machine for delivering a modified beverage from the cartridge.

14 Claims, 5 Drawing Sheets

(51) Int. Cl.
*B65D 85/804* (2006.01)
*A47J 31/36* (2006.01)

(52) U.S. Cl.
CPC ...... *B65D 85/8043* (2013.01); *B65D 2203/06* (2013.01); *B65D 2203/12* (2013.01)

(56) References Cited

U.S. PATENT DOCUMENTS

| | | | |
|---|---|---|---|
| 9,131,799 B2* | 9/2015 | Kamerbeek | A47J 31/0673 |
| 2004/0211322 A1 | 10/2004 | Halliday et al. | |
| 2007/0203587 A1 | 8/2007 | Erlandsson et al. | |
| 2009/0084269 A1 | 4/2009 | Pozzari et al. | |
| 2009/0181143 A1 | 7/2009 | Lossota | |
| 2010/0147873 A1 | 6/2010 | Tanner et al. | |
| 2010/0263546 A1 | 10/2010 | Leuzinger et al. | |
| 2012/0177794 A1 | 7/2012 | Hansen | |
| 2013/0064929 A1 | 3/2013 | Jarisch et al. | |
| 2013/0064937 A1 | 3/2013 | Jarisch et al. | |

FOREIGN PATENT DOCUMENTS

| | | |
|---|---|---|
| CN | 101754705 A | 6/2010 |
| CN | 101862119 A | 10/2010 |
| DE | 102007032287 A1 | 1/2009 |
| EP | 1440639 A1 | 7/2004 |
| EP | 2071986 A1 | 6/2009 |
| GB | 2485575 A | 5/2012 |
| WO | 2009007292 A1 | 1/2009 |
| WO | 2009077488 A2 | 6/2009 |
| WO | WO-2010026053 A1 * 3/2010 .............. A47J 31/22 |
| WO | 2011067156 A1 | 6/2011 |
| WO | 2011141535 A1 | 11/2011 |

OTHER PUBLICATIONS http://oneofsix82.rssing.com/chan-19679762/all_p1.html dated Dec. 2007.*
http://www.instructables.com/answers/how-to-recycle-Tassimo-T-discs-is-it-do-able/ dated 2011.*
International Search Report, dated May 14, 2013 for PCT/IB2013/000221 (2 pgs.).
Written Opinion of the International Search Report for PCT/IB2013/000221 (4 pgs.).
Intellectual Property Office Search Report dated Jun. 8, 2012 for GB1202089.7 (4 pgs.).
Intellectual Property Office Examination Report dated Nov. 22, 2013 for GB1202089.7 (2 pgs.).

* cited by examiner

BEVERAGE PREPARATION SYSTEM, A CODED INSERT AND METHODS OF USE THEREOF

CROSS REFERENCE TO RELATED APPLICATIONS

This application is a U.S. national phase application of International Application No. PCT/IB2013/000221, filed Jan. 29, 2013, which claims benefit from from Great Britain Application 1202089.7, filed Feb. 7, 2012, which are hereby incorporated herein by reference in their entirety.

Field

The present disclosure relates to a beverage preparation system, a coded insert for use in such systems and methods of use.

BACKGROUND

Machines for dispensing beverages are well known. In more recent times 'on-demand' beverage machines have been marketed which allow for beverages to be produced on an individual basis as required by a user from individual sealed capsules, cartridges or flexible bags of ground coffee.

Still more recently, beverage machines allowing for convenient, on demand dispensation of a range of beverage types have been produced. One example of such a system is marketed under the brand name TASSIMO® by Kraft Foods, Inc. This system (as described in EP1440639) utilises a beverage preparation machine that comprises a barcode reader and a range of beverage cartridges wherein each beverage cartridge contains one or more beverage ingredients and is coded with a barcode. In use, the barcode reader of the beverage machine scans and reads the barcode on a beverage cartridge after it is inserted into the machine and uses information decoded from the barcode to set one or more dispensation parameters of the beverage machine for that dispensation cycle. For each beverage cartridge the manufacturer determines the dispensation parameters and applies the relevant barcode at the point of manufacture.

WO2011/141535 describes a support adapted to be associated with a beverage capsule comprising a circumferential sequence of symbols which are readable by an external device as the capsule is driven in rotation. In one embodiment the support can be a separate part that can be coupled to a capsule that has no embedded means for storing information so as to provide a means of adding such information to the capsule. The purpose of the support is to provide means for adding a machine-readable code to a capsule that has no machine-readable code so as to allow the capsule to be dispensed using a beverage preparation machine that requires a code to be read by a code reader in order to function. However, the support of WO2011/141535 is not adapted and configured to provide a means for modifying the delivery parameters of an already encoded beverage capsule or cartridge which is already usable in the beverage preparation machine.

BRIEF SUMMARY OF THE DISCLOSURE

The present disclosure provides a beverage preparation system comprising a beverage preparation machine, a cartridge containing one or more beverage ingredients, and a coded insert;

the beverage preparation machine comprising a brew head for receiving the cartridge;
the cartridge comprising a primary code configured to provide operating instructions to the beverage preparation machine for delivering a beverage from the cartridge;
the coded insert being separate from the cartridge and insertable along with the cartridge into the brew head;
wherein the coded insert comprises a secondary code configured to provide alternative operating instructions to the beverage preparation machine for delivering a modified beverage from the cartridge.

In the present disclosure reference to delivering a beverage includes within its meaning (unless the context otherwise requires) the dispensation of a complete beverage, for example a cup of coffee, as well as the dispensation of a portion of a beverage, for example the coffee portion of a cappuccino.

In the present disclosure reference to a cartridge includes within its meaning (unless the context otherwise requires) rigid and semi-rigid cartridges, capsules and similar containers for beverage ingredients as well as flexible pods, pads and similar containers for beverage ingredients.

Advantageously, the use of the coded insert allows a user of the beverage preparation machine to control the dispensation parameters of the beverage. For example, a range of coded inserts could be provided with a user able to choose a coded insert to use depending on the type of beverage desired. By inserting the coded insert into the brew head along with the cartridge a simplified system is achieved as it is not necessary to provide the beverage preparation machine with a separate mechanism, such as a card reader, for receiving the coded insert. Therefore the beverage preparation system may be more compact and less expensive to manufacture.

Advantageously, with such cartridges, the coded insert can be used to modify the dispensed beverage compared to the manner in which the beverage would normally be dispensed using the primary code. Thus, the user can choose whether to use the cartridge to produce a normal beverage (without using the coded insert) or use the cartridge with the coded insert to produce a modified beverage.

The modified beverage may differ from the standard beverage in one or more of the following group of parameters: volume of beverage dispensed, temperature of beverage dispensed, and flow rate of beverage dispensed.

The system finds particular application in allowing cartridges which are normally used to dispense a hot beverage to be modified to be better suited to prepare an iced beverage. For example, a cartridge containing roast and ground coffee may be provided with a primary code that is configured to instruct the beverage preparation machine to normally brew a coffee beverage of 280 ml in volume with water at a temperature of 90 degrees Celsius. The beverage would normally be brewed into an empty cup. The coded insert may contain a secondary code that is configured to instruct the beverage preparation machine to use water at the same temperature of 90 degrees Celsius but to only dispense a volume of 230 ml. This reduced volume allows for the beverage to be better dispensed into a cup containing ice cubes or similar and thus prepare an iced coffee beverage.

The coded insert may be locatable so as to obscure the primary code provided on the cartridge from a code reader of the beverage preparation machine. This ensures that the secondary code is read when desired.

On insertion of the coded insert and cartridge into the brew head, the coded insert may be shaped and sized to be stacked underneath the cartridge. Advantageously, this provides a space-efficient method of inserting the coded insert into the brew head. It also allows the cartridge to remain stably inserted in the brew head. Where the coded insert is relatively thin, this arrangement also allows the coded insert to be used without modification of the brew head as the small additional height of the cartridge plus coded insert does not materially affect the closure of the brew head.

The beverage preparation machine may comprise a barcode reader and the coded insert may comprise a barcode. The barcode may use a proprietary encoding symbology or a standardised symbology such as Universal Product Code (UPC) or European Article Number-13 (EAN-13). While the use of barcodes is preferred other means of encoding may be utilised such as QR codes, transponders such as RFID tags or even bumps, pegs or other projections which interact physically with a reader in the brew head.

The coded insert may comprise a plurality of codes such as barcodes. This allows a single coded insert to provide a user with a plurality of modified beverages to choose from.

The brew head may comprise an inlet piercer for forming an inlet in the cartridge and/or an outlet piercer for forming an outlet in the cartridge, wherein the coded insert may comprise one or more apertures such that the coded insert may be locatable over the inlet piercer and/or outlet piercer without piercing of the coded insert. Advantageously the coded insert is suitable for use with brew heads that have one or more projecting piercer elements since it can be located such that the element(s) are not impeded.

The beverage preparation system may be an 'on demand' system using individual cartridges which are sealed prior to use and designed primarily for dispensing individual beverages.

The present disclosure also provides a coded insert for use with a beverage preparation machine of the type comprising a brew head and with a cartridge of the type containing one or more beverage ingredients and having a primary code configured to provide operating instructions to the beverage preparation machine for delivering a beverage from the cartridge;

the coded insert being shaped and sized to be locatable within the brew head along with the cartridge and comprising a secondary code configured to provide alternative operating instructions to the beverage preparation machine for delivering a modified beverage from the cartridge.

Advantages of the coded insert may be understood with reference to the comments made above on the beverage preparation system of the present disclosure.

Preferably the modified beverage differs from the beverage in one or more of the following group of parameters: volume of beverage dispensed, temperature of beverage dispensed, and flow rate of beverage dispensed.

The coded insert may comprise a barcode.

The coded insert may comprise a plurality of barcodes. The coded insert may be insertable into the brew head is a number of angular orientations in order to allow selection of a required secondary code. Alternatively the coded insert may comprise first and second parts that are relatively movable to one another to allow selection of a required secondary code.

The coded insert may comprise one or more apertures for accommodating an inlet piercer and/or an outlet piercer of the beverage preparation machine.

The coded insert may have a planar form.

The coded insert may comprise a machine-readable code on an obverse side and user operating instructions on a reverse side. The user operating instructions may be provided as written words or pictograms.

The coded insert, is preferably reusable.

The present disclosure further provides a method of dispensing a beverage from a beverage preparation machine using a cartridge containing one or more beverage ingredients, and a separate coded insert, wherein the cartridge comprises a primary code configured to provide operating instructions to the beverage preparation machine for delivering a beverage from the cartridge, and the coded insert comprises a secondary code configured to provide alternative operating instructions to the beverage preparation machine for delivering a modified beverage from the cartridge; the method comprising the steps of:

inserting the cartridge and the coded insert into a brew head of the beverage preparation machine;

operating the beverage preparation machine to read operating instructions from the coded insert;

preparing and dispensing the beverage according to the operating instructions read from the coded insert.

Advantages of the method may be understood with reference to the comments made above on the beverage preparation system of the present disclosure.

On insertion of the coded insert and cartridge into the brew head, the coded insert may obscure the primary code from a code reader of the beverage preparation machine.

The cartridge may be sealed prior to insertion into the brew head.

BRIEF DESCRIPTION OF THE DRAWINGS

Embodiments of the present disclosure will now be described, by way of example only, with reference to the accompanying drawings, in which.

Figure 1:
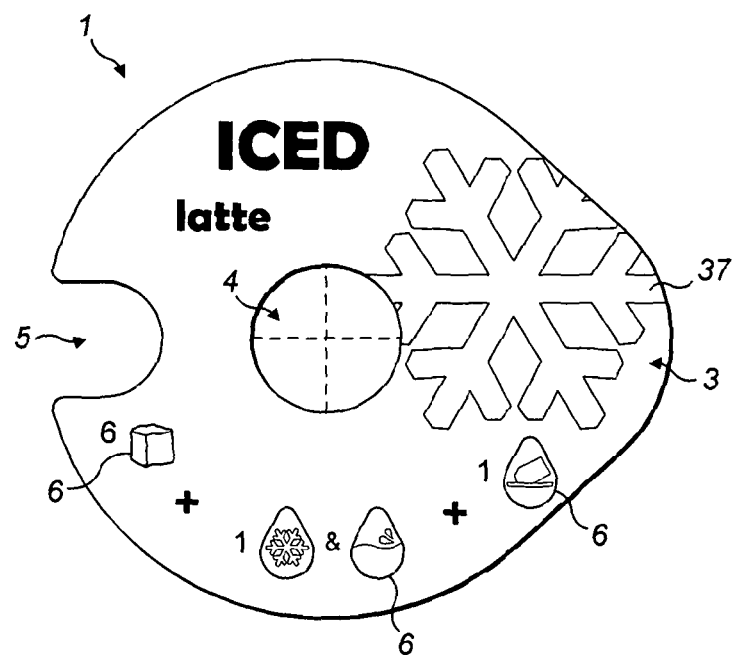
FIG. 1 is a view of a reverse side of a coded insert according to the present disclosure.
Figure 2:
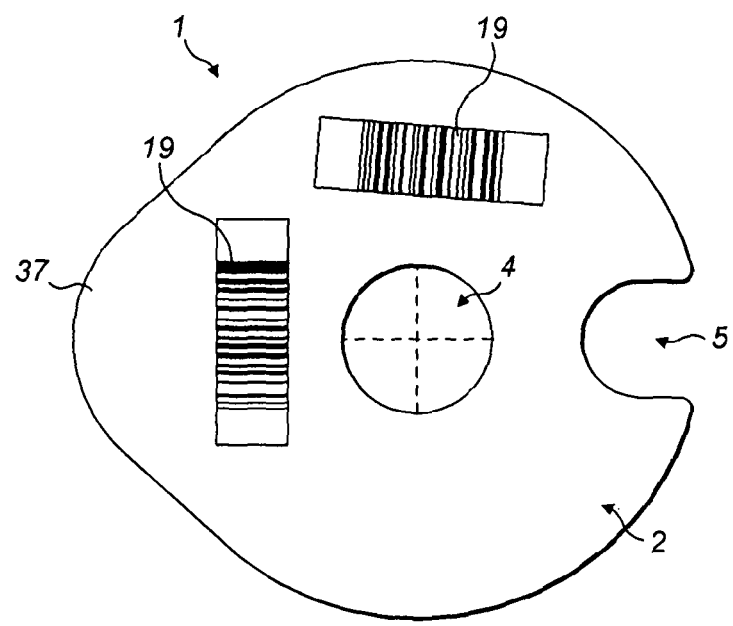
FIG. 2 is a view of the obverse side of the coded insert of FIG. 1.

The coded insert 1 of FIGS. 1 and 2 comprises a planar body having an obverse side 2 and a reverse side 3.

DETAILED DESCRIPTION

In the following examples the coded insert 1 will be described for use with a Tassimo® beverage preparation machine manufactured by Kraft Foods, Inc. and which is described, for example in EP1440639, the contents of which are incorporated herein in their entirety. Such a beverage preparation machine comprises a water reservoir that is fluidly connected to a water inlet of a brew head which comprises a fixed lower part and a pivotable upper part and pivotable cartridge mount that can be opened to allow insertion of a cartridge (such as a T-Disc® cartridge) containing beverage ingredients and provided with a barcode for providing operating parameters to the beverage preparation machine. The brew head comprises an outlet in the lower part through which beverages are dispensed. The brew head is shaped to receive the cartridge in a specific orientation. The water is heated either by providing an immersion heater in the reservoir or pumping the water via a resistive flow heater or thermoblock. One or more temperature sensors are provided for controlling the temperature of the water dispensed. Volume control is provided by use of a flow meter or by controlling the number of pump cycles of a positive displacement pump. The beverage machine comprises a microprocessor control linked to the heater, pump, flow meter, temperature sensor(s) and also to a barcode reader of the brew head. The brew head is provided with an inlet piercer coupled to the water inlet and an outlet piercer coupled to the outlet of the brew head. In use the piercers form an inlet and an outlet in the previously sealed cartridges inserted into the brew head. Preferably, the inlet and outlet piercers are formed as a single replaceable piercer unit. In use, on insertion of the cartridge into the brew head the barcode reader is operated to read the barcode of the cartridge and so configure the brewing parameters for the individual brew cycle.

It should be understood that the present disclosure is not limited to a coded insert for Tassimo® beverage machines, and the coded insert a may be configured to work with other beverage preparation machines.

The planar body of the coded insert 1 is substantially disc shaped although a lobe 37 is provided at one point on the circumference. The lobe 37 provides a suitable handle for gripping the coded insert 1 and also ensures correct alignment of the coded insert 1 when inserted into the brew head of the beverage preparation machine as shown in FIG. 5a to 5d.

The coded insert 1 comprises a central aperture 4 and a peripheral aperture 5. The peripheral aperture 5 may comprise a slot (as shown in FIGS. 1 and 2) which extends inwardly from the edge of the body part way towards the centre of the disc. Alternatively, the peripheral aperture 5 may take the form of a hole fully bounded by the material of the coded insert 1 which is located near the peripheral edge of the coded insert 1.

The obverse side 2 is provided with two barcodes 19. (A single barcode 19 may be provided where the coded insert 1 is designed to work with only a single model of beverage preparation machine. Multiple barcodes 19 may be provided where the coded insert 1 is designed to work with multiple beverage preparation machine models which have their barcode readers located in different positions in their respective brew heads).

The reverse side 3 is provided with a plurality of pictograms 6 providing user operating instructions.

Figure 3:
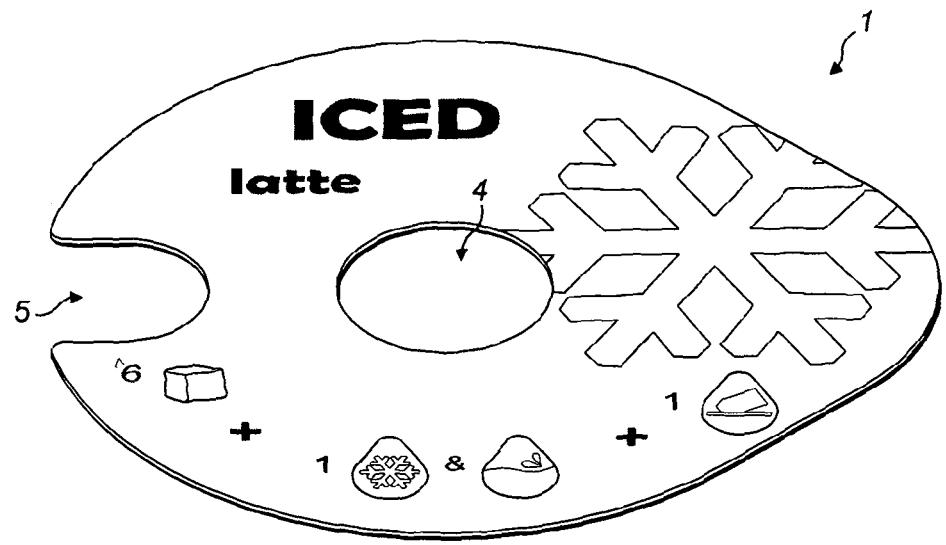
FIG. 3 is a perspective view of the coded insert of FIG. 1.
Figure 4:
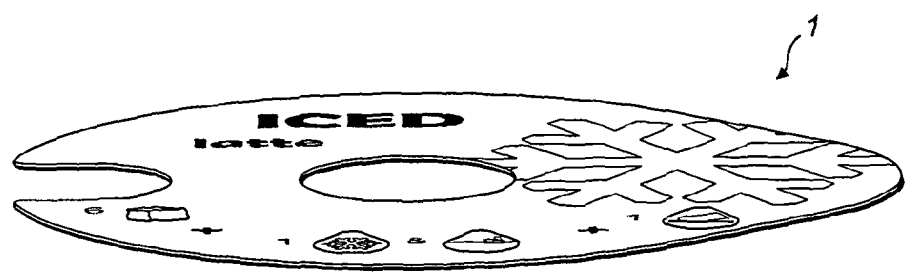
FIG. 4 is a near side-on view of the coded insert of FIG. 1.
Figure 5A:
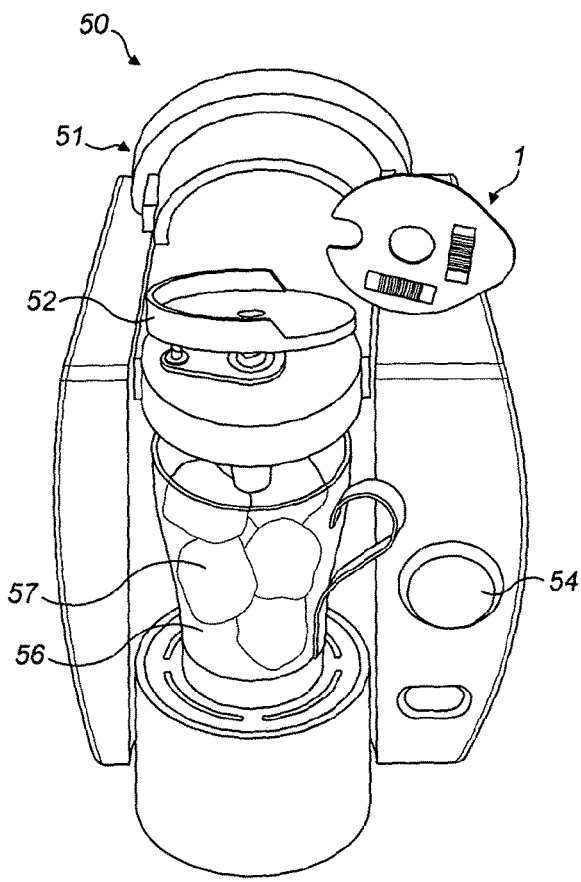
FIGS. 5*a* to 5*d* illustrate the insertion of the coded insert of FIG. 1 into a beverage preparation machine.
Figure 5B:
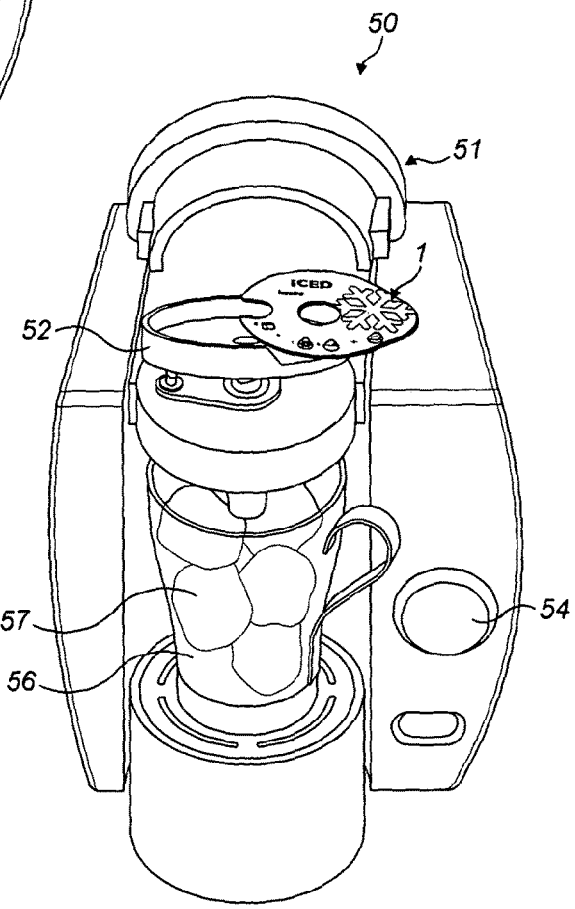
Figure 5C:
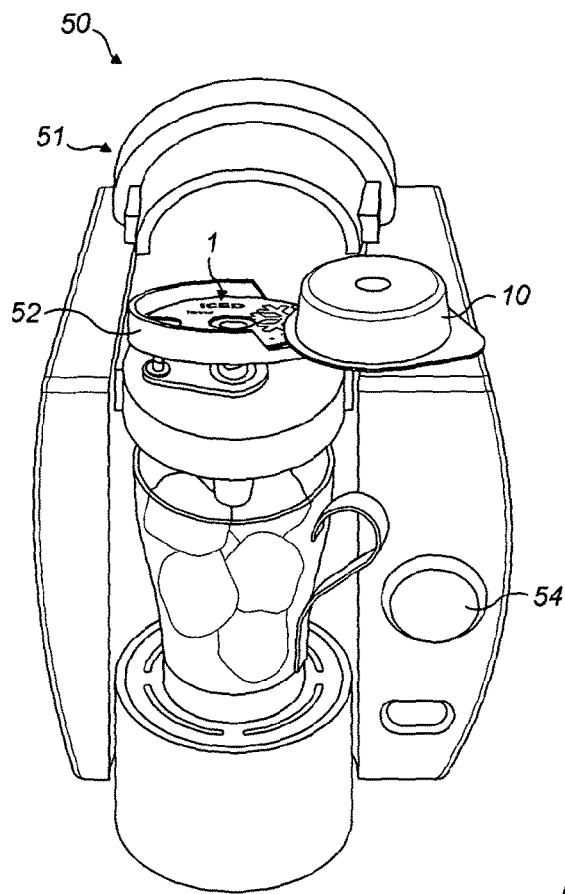
Figure 5D:
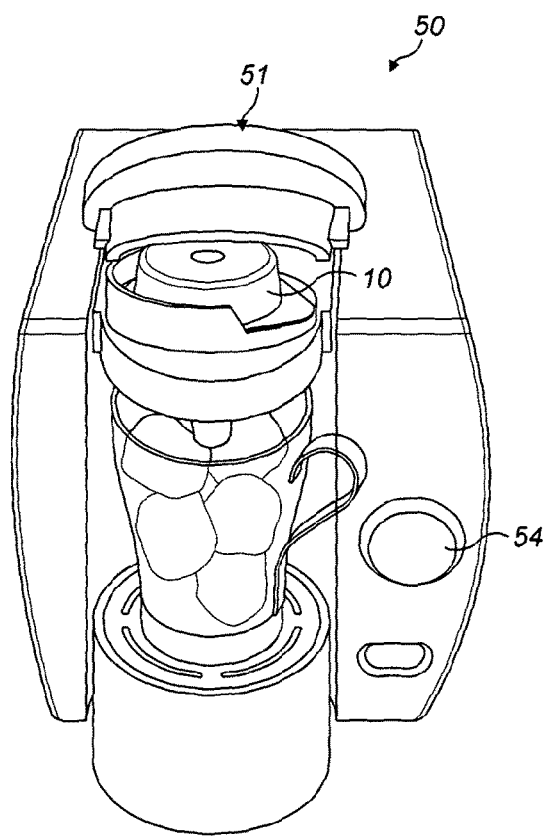

As shown in FIGS. 3 and 4 the coded insert 1 is thin compared to its diameter. Typical dimensions for one example are a diameter (not including the lobe 37) of 68 mm and a thickness of preferably 0.3 to 1.0 mm.

The coded insert 1 may be manufacture from any suitable material, advantageously one which is durable, water resistant and wipe clean. An example is polyethylene terephthalate (PET).

In use, as shown in FIGS. 5a to 5d the brew head 51 of the beverage preparation machine 50 is opened to expose a pivotable cartridge mount 52 which normally directly receives the cartridge 10 containing the beverage ingredients. Instead, the coded insert 1 is first placed on the cartridge mount 52 with the obverse side 2 lowermost and the cartridge 10 is stacked on top.

The brew head 51 is then closed pivoting the cartridge mount 52, cartridge 10 and coded insert 1 downwardly so as to pierce the underside of the cartridge 10 with the inlet and outlet piercers of the beverage preparation machine 50 in the normal manner. During this closing operation the outlet piercer passes through the central aperture 4 of the coded insert 1 and the inlet piercer passes through the peripheral aperture 5 such that the coded insert 1 is not damaged and the piercers are not impeded.

When stacked in this configuration the barcode 19 on the coded insert 1 is aligned with the barcode reader of the brew head and also obstructs the barcode on the cartridge 10 from being read when start/stop button 54 is pressed.

Thus, on pressing the start/stop button 54 the barcode 19 of the coded insert 1 will be read in place of the barcode of the cartridge 10 and a modified beverage will be dispensed.

The coded insert 1 may be used to modify one or more brewing parameters for a number of reasons. One reason may be to alter the strength of the beverage by altering the volume of beverage dispensed or the flow rate of water. Another reason may be to provide improved iced or cold beverages using cartridges 10 normally configured to dispense hot beverages.

Example 1—Iced Latte

A coded insert 1 is provided to dispense an iced latte beverage using an 'Espresso' T-Disc® and a 'Creamer from milk' T-Disc® both available from Kraft Foods, Inc. First a user places six ice cubes in a glass. Next the coded insert 1 and the 'Creamer from milk' T-Disc® are inserted in stacked configuration and brewed to dispense a milk-based beverage portion of reduced volume than normal onto the ice cubes. The coded insert 1 and 'Creamer from milk' T-Disc® are removed and the 'Espresso' T-Disc® is inserted and brewed as normal to add a coffee portion into the glass to complete the iced latte.

Suitable pictograms 6 for this example are shown in FIG. 1.

Example 2—Iced Espresso

A coded insert 1 is provided to dispense an iced espresso beverage using an 'Espresso' T-Disc® available from Kraft Foods, Inc. First a user places six ice cubes in a glass. Next the coded insert 1 and the 'Espresso' T-Disc® are inserted in stacked configuration and brewed to dispense a coffee beverage portion of reduced volume than normal onto the ice cubes to complete the iced espresso. Optionally a spoonful of sugar can be added.

Example 3—Iced Mint Tea

A coded insert 1 is provided to dispense an iced mint tea beverage using an 'Twinings® Green Tea and Mint'® T-Disc® available from Kraft Foods, Inc. First a user places six ice cubes in a glass. Next the coded insert 1 and the 'Twinings® Green Tea and Mint' T-Disc® are inserted in stacked configuration and brewed to dispense a tea beverage portion of reduced volume than normal onto the ice cubes to complete the iced mint tea. Optionally a spoonful of sugar can be added.

The coded insert 1 may be reusable.

In a Modified embodiment the coded insert 1 may be disc shaped without a lobe 37 and be provided with a plurality of barcodes 19. In use the coded insert can be inserted into the brew head in a plurality of angular orientations to allow a user to choose a specific barcode to be read.

Figure 6:
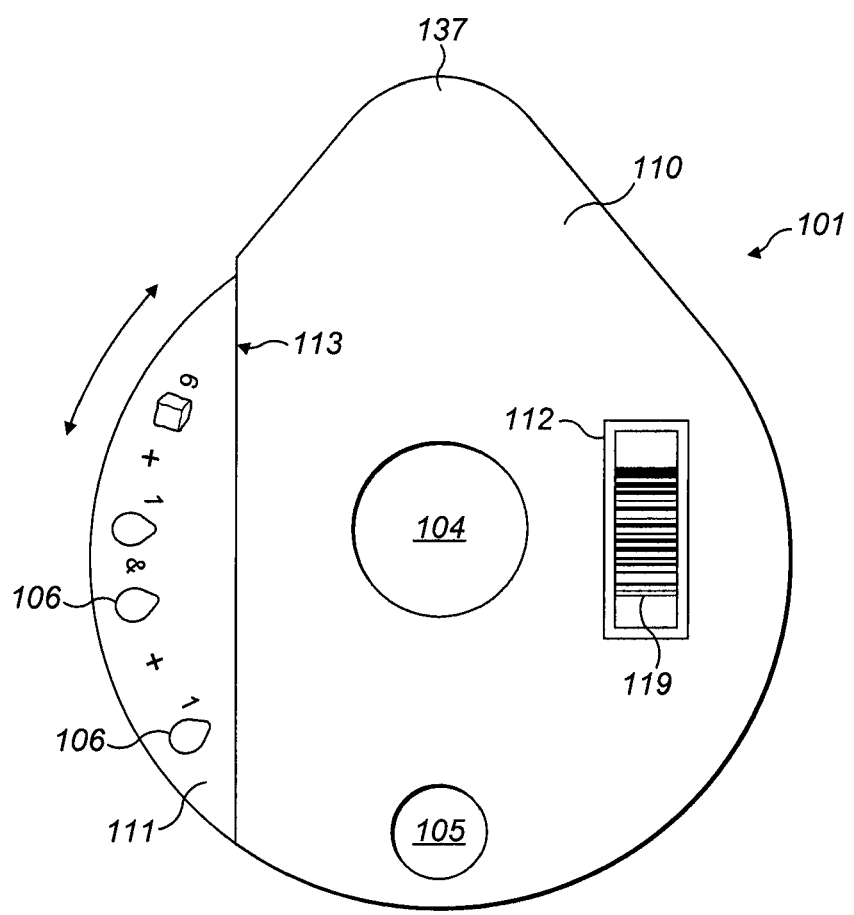
FIG. 6 is a view of an alternative coded insert according to the present disclosure.

FIG. 6 shows an alternative coded insert 101 which again is planar and relatively thin but comprises a first member 110 and a second member 111 which is rotatably mounted to the first member 110 by any suitable means such as a pin on one member and a retaining socket on the other member. The second member 111 is disc shaped. The first member 110 is generally disc shaped except for a protruding lobe 137 and a cut-off edge portion 113 which exposes the second member 111. The first member 110 is provided with a rectangular window 112.

The second member 111 is provided with a plurality of barcodes 119 which can be interchangeably viewed through the window 112 by rotating the second member 111 relative to the first member 112.

Both the second member 111 and first member 111 have an aligned central aperture 104. The first member has a peripheral aperture 105 and the second member has a plurality of outer apertures that each align with the peripheral aperture 105 of the first member 110 when the barcodes 119 are in register with the window 112.

Pictograms 106 providing user instructions may be provided as before on the reverse side or, as illustrated, may be provided on the obverse side of the second member 112.

In use a user first chooses which modified beverage they wish to dispense by rotating the second member 111 to display the correct barcode 119 in the window 112. The coded insert 101 is then inserted into the brew head 51 with the appropriate cartridge and brewed as described above in the previous embodiments.

The coded insert 101 may alternatively have a sandwich structure wherein the second member 111 is rotatably mounted between two first members 110.

The invention claimed is:

1. A beverage preparation system comprising a beverage preparation machine, a cartridge containing one or more beverage ingredients, and a coded insert;
   the beverage preparation machine comprising a brew head for receiving the cartridge;
   the cartridge comprising a primary code configured to provide operating instructions to the beverage preparation machine for delivering a beverage from the cartridge;
   the coded insert being separate from the cartridge and insertable along with the cartridge into the brew head, the coded insert having a planar form;
   wherein the coded insert comprises a secondary code configured to provide alternative operating instructions to the beverage preparation machine for delivering a modified beverage from the cartridge;
   wherein the brew head comprises an inlet piercer for forming an inlet in the cartridge and/or an outlet piercer for forming an outlet in the cartridge, wherein the coded insert comprises one or more apertures such that the coded insert is locatable over the inlet piercer and/or outlet piercer without piercing of the coded insert;
   wherein the coded insert comprises a first member and a second member which is rotatably mounted to the first member, the first member having a rectangular window and the second member having a plurality of secondary codes which can be interchangeably viewed through the window by rotating the second member relative to the first member.

2. A beverage preparation system as claimed in claim 1 wherein the modified beverage differs from the beverage in one or more of the following group of parameters: volume of beverage dispensed, temperature of beverage dispensed, and flow rate of beverage dispensed.

3. A beverage preparation system as claimed in claim 1 wherein the coded insert is locatable so as to obscure the primary code provided on the cartridge from a code reader of the beverage preparation machine.

4. A beverage preparation system as claimed in claim 1 wherein on insertion of the coded insert and cartridge into the brew head, the coded insert is shaped and sized to be stacked underneath the cartridge.

5. A beverage preparation system as claimed in claim 1 wherein the beverage preparation machine comprises a barcode reader and the coded insert comprises a barcode.

6. A beverage preparation system as claimed in claim 5 wherein the coded insert comprises a plurality of barcodes.

7. A beverage preparation system as claimed in claim 1 wherein a thickness of the coded insert is between 0.3 and 1.0 mm.

8. A beverage preparation system as claimed in claim 1 wherein the one or more apertures of the coded insert includes a central aperture.

9. A beverage preparation system as claimed in claim 1 wherein the one or more apertures of the coded insert includes a peripheral aperture in the form of a slot which extends inwardly from an edge of the coded insert.

10. A beverage preparation system as claimed in claim 8 wherein the one or more apertures of the coded insert includes a peripheral aperture in the form of a slot which extends inwardly from an edge of the coded insert.

11. A beverage preparation system as claimed in claim 1 wherein the coded insert is substantially disc shaped with a lobe provided on the circumference thereof.

12. A beverage preparation system as claimed in claim 1 wherein the coded insert has a perimeter with a shape that ensures correct alignment when inserted into the brew head of the beverage preparation machine.

13. A beverage preparation system as claimed in claim 1 wherein the first member has a cut off edge portion which exposes the second member.

14. A beverage preparation system as claimed in claim 1 wherein two of the first members sandwich the second member.

\* \* \* \* \*